(12) United States Patent
Fujii et al.

(10) Patent No.: US 10,382,832 B2
(45) Date of Patent: Aug. 13, 2019

(54) INFORMATION PROCESSING APPARATUS AND INFORMATION PROCESSING METHOD

(71) Applicant: FUJI XEROX CO., LTD., Tokyo (JP)

(72) Inventors: Akira Fujii, Yokohama (JP); Suresh Murali, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/205,546

(22) Filed: Jul. 8, 2016

(65) Prior Publication Data

US 2017/0251274 A1 Aug. 31, 2017

(30) Foreign Application Priority Data

Feb. 29, 2016 (JP) ................................. 2016-036943

(51) Int. Cl.
*H04L 29/06* (2006.01)
*H04N 21/44* (2011.01)
(Continued)

(52) U.S. Cl.
CPC ..... *H04N 21/6373* (2013.01); *H04L 65/4092* (2013.01); *H04N 21/2385* (2013.01);
(Continued)

(58) Field of Classification Search
CPC ....... H04N 21/6373; H04N 21/234363; H04N 21/234381; H04N 21/23439; H04N 21/2385; H04N 21/41407; H04N 21/4331; H04N 21/437; H04N 21/47217; H04N 21/8153; H04N 21/26258;
(Continued)

(56) References Cited

U.S. PATENT DOCUMENTS

2003/0012560 A1 1/2003 Mori et al.
2003/0222974 A1* 12/2003 Yoneyama ............... H04N 5/04
348/14.12
(Continued)

FOREIGN PATENT DOCUMENTS

CN 104079954 A 10/2014
CN 105230024 A 1/2016
(Continued)

OTHER PUBLICATIONS

Contribution to the Server and Network Assisted DASH Operation CE, ISO/IEC JTC1/SC29/WG11, MPEG2013/m30357, Jul. 2013).*
(Continued)

*Primary Examiner* — Nathan J Flynn
*Assistant Examiner* — Caroline Somera
(74) *Attorney, Agent, or Firm* — Oliff PLC

(57) ABSTRACT

An information processing apparatus includes: a first specifying unit that specifies a size of a display region of a video delivered by streaming, the video having a bit rate that is changeable during a playback; a second specifying unit that specifies a data amount of data temporarily stored for a period of the video to be next played back; and a third specifying unit that specifies a bandwidth in reception of the data. The information processing apparatus further includes a determining unit that determines a bit rate of the video that is played back based on the size, the data amount, and the bandwidth that are specified.

14 Claims, 10 Drawing Sheets

(51) Int. Cl.
*H04N 21/61* (2011.01)
*H04N 21/81* (2011.01)
*H04N 21/262* (2011.01)
*H04N 21/414* (2011.01)
*H04N 21/433* (2011.01)
*H04N 21/437* (2011.01)
*H04N 21/442* (2011.01)
*H04N 21/462* (2011.01)
*H04N 21/472* (2011.01)
*H04N 21/482* (2011.01)
*H04N 21/845* (2011.01)
*H04N 21/2343* (2011.01)
*H04N 21/2385* (2011.01)
*H04N 21/6373* (2011.01)

(52) U.S. Cl.
CPC ........... *H04N 21/23439* (2013.01); *H04N 21/234363* (2013.01); *H04N 21/234381* (2013.01); *H04N 21/26258* (2013.01); *H04N 21/41407* (2013.01); *H04N 21/437* (2013.01); *H04N 21/4331* (2013.01); *H04N 21/44004* (2013.01); *H04N 21/44209* (2013.01); *H04N 21/4621* (2013.01); *H04N 21/47217* (2013.01); *H04N 21/4825* (2013.01); *H04N 21/6125* (2013.01); *H04N 21/8153* (2013.01); *H04N 21/8456* (2013.01)

(58) Field of Classification Search
CPC ....... H04N 21/44004; H04N 21/44209; H04N 21/4621; H04N 21/4825; H04N 21/6125; H04N 21/8456; H04L 65/4092
USPC .......................................................... 725/90
See application file for complete search history.

(56) References Cited

U.S. PATENT DOCUMENTS

| | | | |
|---|---|---|---|
| 2004/0145660 A1 | 7/2004 | Kusaka | |
| 2008/0068486 A1 | 3/2008 | Kusaka | |
| 2008/0143877 A1 | 6/2008 | Urabe et al. | |
| 2011/0268428 A1 | 11/2011 | Chen et al. | |
| 2012/0195388 A1 | 8/2012 | Oike | |
| 2013/0028576 A1* | 1/2013 | Ushimaru | H04L 12/2812 386/326 |
| 2013/0091248 A1 | 4/2013 | Viswanathan et al. | |
| 2013/0124748 A1* | 5/2013 | Virdi | H04N 21/2358 709/231 |
| 2013/0195204 A1 | 8/2013 | Reznik et al. | |
| 2013/0227080 A1* | 8/2013 | Gao | H04L 65/1083 709/219 |
| 2013/0279565 A1* | 10/2013 | Nilsson | H04N 19/00169 375/240.02 |
| 2013/0282917 A1 | 10/2013 | Reznik et al. | |
| 2014/0040959 A1 | 2/2014 | Oyman | |
| 2014/0258552 A1* | 9/2014 | Oyman | H04N 19/146 709/231 |
| 2014/0298394 A1 | 10/2014 | Kurihara | |
| 2014/0365677 A1 | 12/2014 | Mueller et al. | |
| 2015/0026358 A1 | 1/2015 | Zhang et al. | |
| 2015/0032899 A1 | 1/2015 | Willars et al. | |
| 2015/0049249 A1 | 2/2015 | Shao et al. | |
| 2015/0156238 A1* | 6/2015 | Cooper | H04N 1/00204 709/219 |
| 2016/0103830 A1* | 4/2016 | Cheong | G06F 3/0488 715/738 |
| 2016/0366454 A1* | 12/2016 | Tatourian | H04N 21/23434 |
| 2017/0041238 A1* | 2/2017 | Do | H04L 47/25 |

FOREIGN PATENT DOCUMENTS

| | | |
|---|---|---|
| EP | 2924999 A1 | 9/2015 |
| JP | 2002-344913 A | 11/2002 |
| JP | 2002-344941 A | 11/2002 |
| JP | 2002-369052 A | 12/2002 |
| JP | 2003-032629 A | 1/2003 |
| JP | 2004-088480 A | 3/2004 |
| JP | 2006-092341 A | 4/2006 |
| JP | 2007-036666 A | 2/2007 |
| JP | 2008-109434 A | 5/2008 |
| JP | 2008-152114 A | 7/2008 |
| JP | 2008-270939 A | 11/2008 |
| JP | 2011-180810 A | 9/2011 |
| JP | 2012-156829 A | 8/2012 |
| JP | 2013-214800 A | 10/2013 |
| JP | 2014-183488 A | 9/2014 |
| JP | 2015-518350 A | 6/2015 |
| JP | 2015-194832 A | 11/2015 |
| JP | 2015-531903 A | 11/2015 |
| KR | 10-2014-0073546 A | 6/2014 |
| WO | 2015-023832 A1 | 2/2015 |

OTHER PUBLICATIONS

Feb. 14, 2017 Search Report issued in European Patent Application No. 16182138.4.

Xin Wang et al. "Contribution to the Server and Network Assisted Dash Operation CE". 105. MPEG Meeting; Jul. 29, 2013-Aug. 2, 2013; Vienna; (Motion Picture Expert Group or ISO/IEC JTC1/SC29/WG11), No. m30357, Jul. 28, 2013, XP030058884.

Brendan Long. "Proposed Study Text FO 23009-3 for Low Latency". 113. MPEG Meeting; Oct. 19, 2015-Oct. 23, 2015; Geneva; (Motion Picture Expert Group or ISO/IEC JTC1/SC29/WG11), No. m37491, Oct. 22, 2015, XP030065859.

Ozgur Oyman et al. "On Sand CE: QoS Signaling for Dash and Proposed Client Adaptation Guidelines". 107. MPEG Meeting; Jan. 13, 2014-Jan. 17, 2014; San Jose; (Motion Picture Expert Group or ISO/IEC JTC1/SC29/WG11), No. m32325, Jan. 9, 2014, XP030060777.

Sep. 12, 2017 Office Action issued in Korean Application No. 10-2016-0095304.

May 28, 2019 Office Action issued in Chinese Patent Application No. 201610643376.3.

May 28, 2019 Office Action issued in Japanese Patent Application No. 2016-036943.

* cited by examiner

| SIZE OF DISPLAY REGION | BIT RATE RANGE (UNIT: Mbps) |
|---|---|
| LESS THAN THRESHOLD VALUE Th1 | 2.0、1.0、0.5、0.3 |
| EQUAL TO OR LARGER THAN THRESHOLD VALUE Th1 AND LESS THAN THRESHOLD VALUE Th2 | 4.0、2.0、1.0、0.5 |
| EQUAL TO OR LARGER THAN THRESHOLD VALUE Th2 | 4.0、2.0、1.0 |

*FIG. 11*
| BANDWIDTH | FILE FORMAT |
|---|---|
| LESS THAN THRESHOLD VALUE Th11 | JPEG |
| EQUAL TO OR LARGER THAN THRESHOLD VALUE Th11 | PNG |
*FIG. 12*
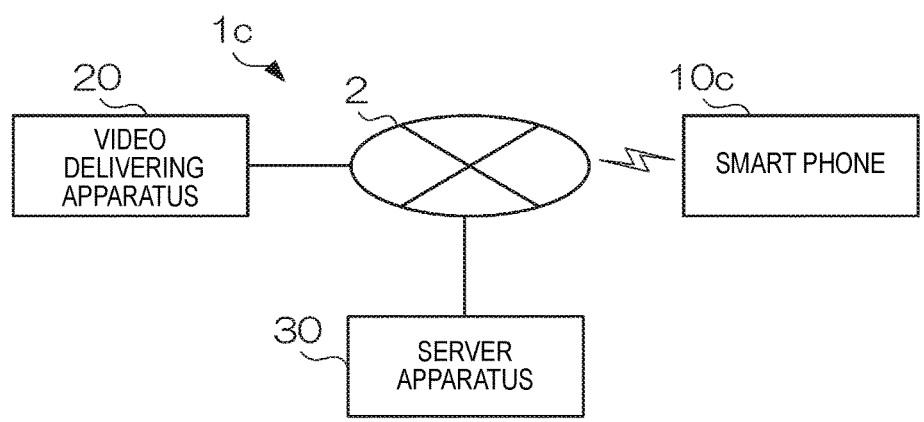
*FIG. 13*
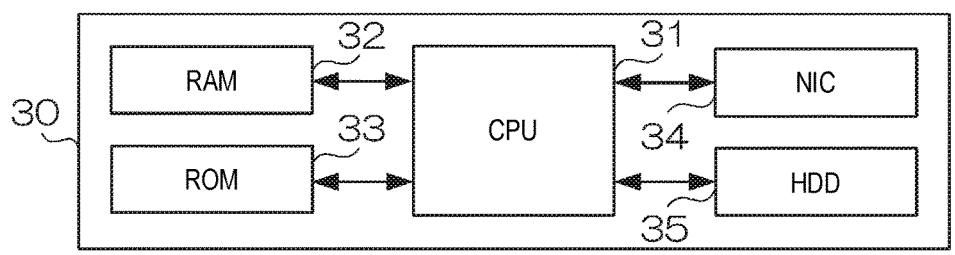

INFORMATION PROCESSING APPARATUS AND INFORMATION PROCESSING METHOD

CROSS-REFERENCE TO RELATED APPLICATIONS

This application is based on and claims priority under 35 USC 119 from Japanese Patent Application No. 2016-36943 filed on Feb. 29, 2016.

BACKGROUND

1. Technical Field

The present invention relates to an information processing apparatus and an information processing method.

2. Related Art

In a technique of playing back a video delivered by streaming, a playback quality such as a resolution level of a video and playback continuity (in which the playback is not interrupted) is important.

SUMMARY

According to an aspect of the invention, there is provided an information processing device, including: a first specifying unit that specifies a size of a display region of a video delivered by streaming, the video having a bit rate that is changeable during a playback; a second specifying unit that specifies a data amount of data temporarily stored for a period of the video to be next played back; a third specifying unit that specifies a bandwidth in reception of the data; and a determining unit that determines a bit rate of the video that is played back based on the size, the data amount, and the bandwidth that are specified.

BRIEF DESCRIPTION OF THE DRAWINGS

Exemplary embodiments of the present invention will be described in detail based on the following figures, wherein:

FIG. 11 is a diagram illustrating an exemplary file format table;

FIG. 12 is a diagram illustrating an overall configuration of a video delivery system according to a modified example;

FIG. 13 is a diagram illustrating a hardware configuration of a server apparatus;

DETAILED DESCRIPTION

[1] Exemplary Embodiments

Figure 1:
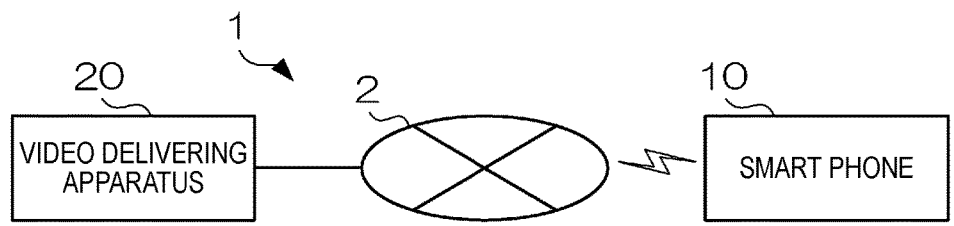
FIG. 1 is a diagram illustrating an overall configuration of a video delivery system according to an exemplary embodiment.

FIG. 1 illustrates an overall configuration of a video delivery system 1 according to an exemplary embodiment. The video delivery system 1 is a system that performs stream delivery of a video to a playback apparatus used by the user. The stream delivery of the video refers to delivery of a video by a mechanism that sequentially plays back segment data indicating a part of a video while transceiving the segment data in a playback order. The video delivery system 1 includes a communication line 2, a smart phone 10, and a video delivering apparatus 20.

The communication line 2 is a system in which exchange of data is relayed between device such as a mobile communication network or the Internet. The smart phone 10 is connected to the communication line 2 in a wireless manner, and the video delivering apparatus 20 is connected to the communication line 2 in a wired manner (it is an example, and they may be connected by any of wireless and wired manners).

The smart phone 10 is a playback device that plays back a video that is delivered by streaming in the video delivery system 1. The smart phone 10 is carried by the user and used in various places. The video delivering apparatus 20 is an information processing apparatus that stores a plurality of pieces of segment data indicating one video as a whole and performs stream delivery of a video by sequentially transmitting the segment data in the playback order. One segment data are data indicating a portion of, for example, about 1 to 10 seconds among the entire the video.

In the video delivery system 1, a video that conforms to a standard called, for example, Moving Picture Experts Group (MPEG)-Dynamic Adaptive Streaming over HTTP (DASH) and has a bit rate that can be changed during the playback thereof is delivered by streaming. In the stream delivery of the exemplary embodiment, a plurality of bit rates are determined in advance.

Figure 2:
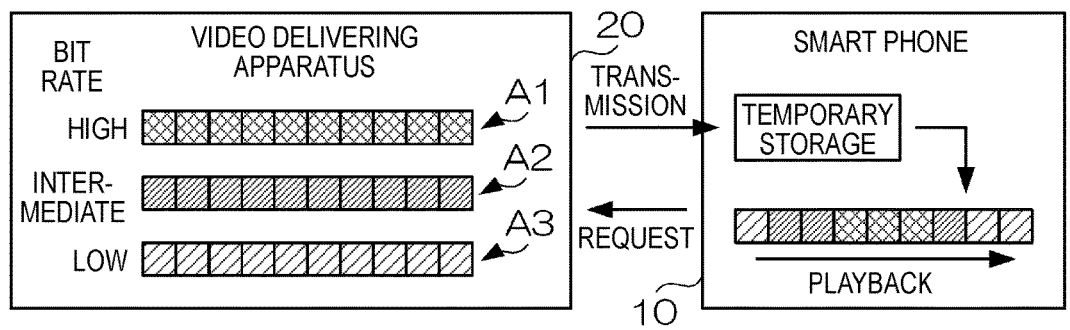
FIG. 2 is a diagram illustrating a stream delivery mechanism.

FIG. 2 illustrates a stream delivery mechanism. The video delivering apparatus 20 according to the exemplary embodiment stores segment data groups A1, A2, and A3 indicating videos having "high," "intermediate," and "low" bit rates, respectively. The bit rate refers to a data amount (having a unit of megabits per seconds (Mbps) or megabytes (MB/sec) that is transceived at intervals of one second.

In the videos indicated by the segment data groups, as the bit rate increases, the resolution and the frame rate of the video increase. The smart phone 10 designates the bit rate of the video to be delivered when requesting the stream delivery of the video. The video delivering apparatus 20 sequentially reads the segment data from the segment data group of the designated bit rate, and transmits the read segment data. The smart phone 10 temporarily stores (caches) the received segment data, and reads and plays back the cached segment data.

Further, when the smart phone 10 designates a different bit rate from that of a video being played back during the playback of the video and requests delivery of segment data of the different bit rate, the video delivering apparatus 20 receives the request, and transmits the segment data of the designated new bit rate. Upon receiving the segment data, the smart phone 10 plays back the video indicated by the segment data of the new bit rate, subsequently to the video indicated by the segment data of the current bit rate. Accordingly, the smart phone 10 displays the video in which the bit rate can be changed during the playback. One of the features of the exemplary embodiment of the present invention lies in the bit rate decision method. The decision method will be described later in detail.

Figure 3:
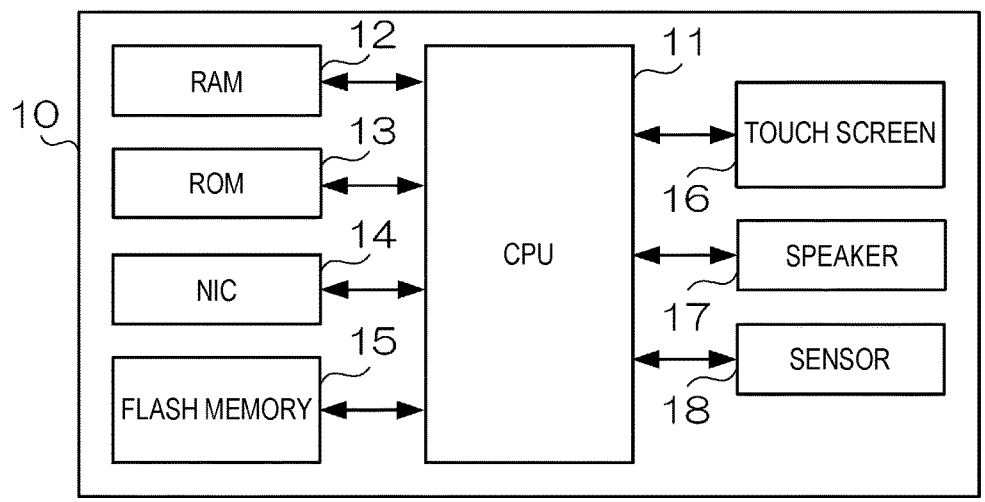
FIG. 3 is a diagram illustrating a hardware configuration of a smart phone.

FIG. 3 illustrates a hardware configuration of the smart phone 10. The smart phone 10 is a computer that includes a central processing unit (CPU) 11, a random access memory (RAM) 12, a read only memory (ROM) 13, a network interface card (NIC) 14, a flash memory 15, a touch screen 16, a speaker 17, and a sensor 18. The CPU 11 controls operations of the respective units by executing a program stored in the ROM 13 or the flash memory 15 using the RAM 12 as a work area. The NIC 14 includes an antenna, a communication circuit, and the like, and performs wireless communication that conforms to, for example, a mobile communication standard.

The flash memory 15 stores data and a program which the CPU 11 uses for control. In this exemplary embodiment, a browser program is included as the program, and a function of the exemplary embodiment of the present invention which will be described later is implemented by Java (a registered trademark) script executed on the browser. The present invention is not limited to this exemplary embodiment, and an application program that implements the function of the present invention may be stored. The touch screen 16 includes a display serving as a display unit and a touch panel installed on the surface of the display, and displays an image and receives an operation from the user. The speaker 17 converts audio data indicating a sound into an analog signal and outputs a sound. The sensor 18 is, for example, a three-axis geomagnetic sensor, and supplies data indicating an inclination of its own apparatus to the CPU 11.

Figure 4:
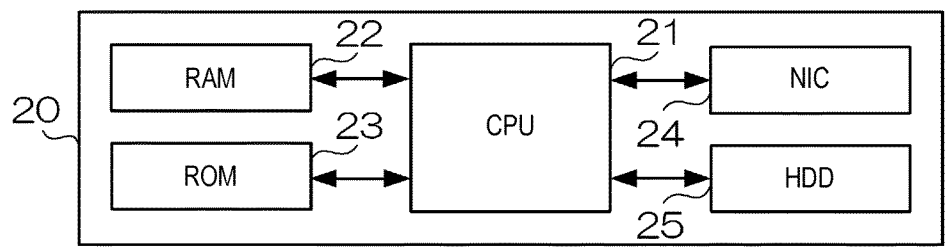
FIG. 4 is a diagram illustrating a hardware configuration of a video delivering apparatus.

FIG. 4 illustrates a hardware configuration of the video delivering apparatus 20. The video delivering apparatus 20 is a computer that includes a CPU 21, a RAM 22, a ROM 23, a NIC 24, and a hard disk drive (HDD) 25. The CPU 21 to the ROM 23 are the same hardware as the components having the same names illustrated in FIG. 3. The NIC 24 includes a communication circuit, and performs communication through the communication line 2. The HDD 25 stores data and a program which the CPU 21 uses for control.

By controlling the respective units by executing the programs through the CPUs of the respective apparatuses included in the video delivery system 1, functions to be described below are implemented.

Figure 5:
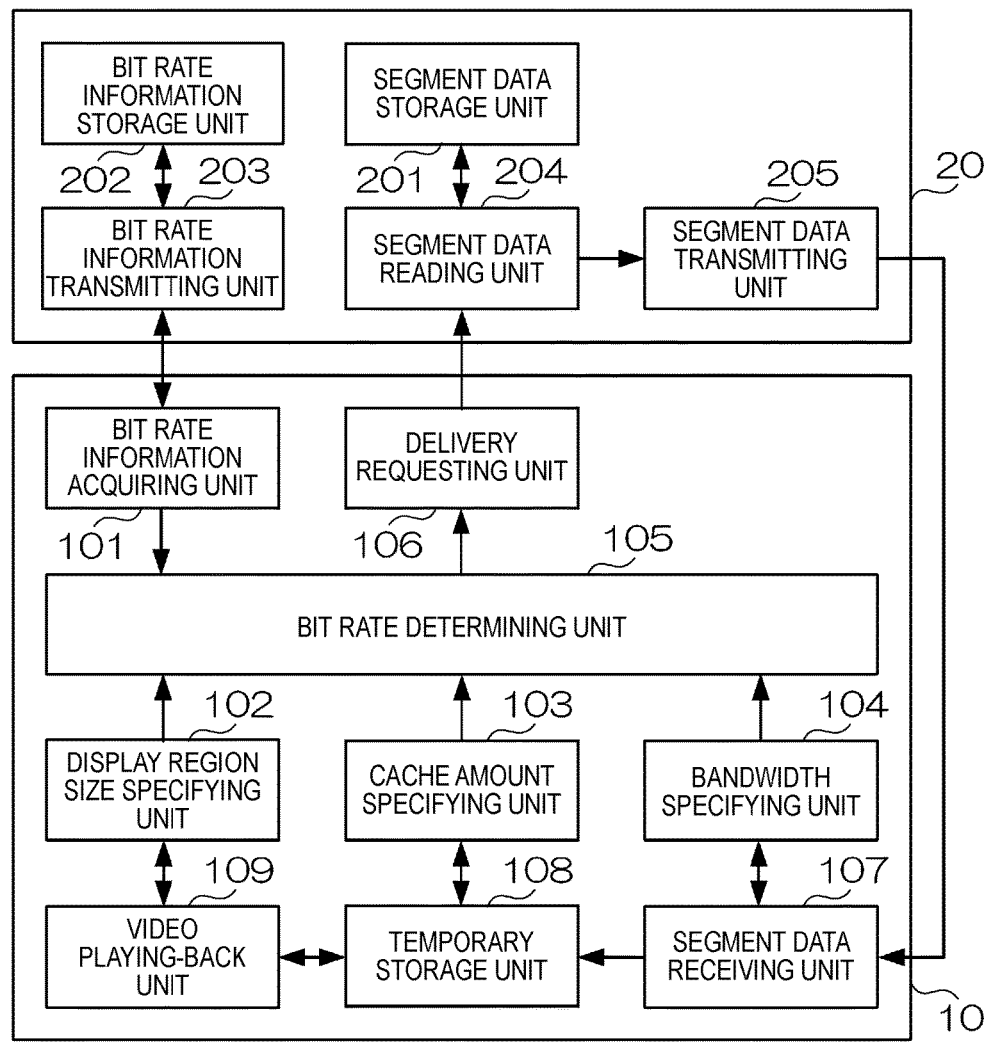
FIG. 5 is a diagram illustrating functional configurations implemented by respective apparatuses.

FIG. 5 illustrates functional configurations implemented by the respective apparatuses. The smart phone 10 includes a bit rate information acquiring unit 101, a display region size specifying unit 102, a cache amount specifying unit 103, a bandwidth specifying unit 104, a bit rate determining unit 105, a delivery requesting unit 106, a segment data receiving unit 107, a temporary storage unit 108, and a video playing-back unit 109. The video delivering apparatus 20 includes a segment data storage unit 201, a bit rate information storage unit 202, a bit rate information transmitting unit 203, a segment data reading unit 204, and a segment data transmitting unit 205.

The segment data storage unit 201 of the video delivering apparatus 20 stores the segment data of the video delivered by streaming by its own apparatus. The segment data storage unit 201 stores the segment data indicating the video of the plurality of bit rates as described above with reference to FIG. 2. Since each piece of the segment data has a small communication amount, each piece of the segment data is encoded (compressed), for example, as data indicating a reference frame and a difference with the frame.

The bit rate information storage unit 202 stores bit rate information (for example, a media presentation description (MPD) in MPEG-Dash) indicating the plurality of bit rates of the video stored in the segment data storage unit 201 and delivered by streaming by its own apparatus. In the example of FIG. 2, the bit rate information storage unit 202 stores the bit rate information indicating the bit rate of the video indicated by each of the segment data groups A1, A2, and A3. For example, when the segment data of the video are stored by an operator of the video delivering apparatus 20, the bit rate information is created and stored by the operator.

In the case of requesting the stream delivery of the video, the bit rate information acquiring unit 101 of the smart phone 10 acquires the bit rate information indicating the plurality of bit rates of the video. For example, a link to the video that is delivered by streaming by the video delivering apparatus 20 is attached in a web page displayed on the smart phone 10, and when the user performs an operation of selecting the link, the bit rate information acquiring unit 101 transmits request data for requesting the bit rate information of the video to the video delivering apparatus 20. The request data include information (for example, a uniform resource locator (URL) of a file (for example, an MPD in MPEG-DASH)) specifying the video.

Upon receiving the request data transmitted from the smart phone 10, the bit rate information transmitting unit 203 of the video delivering apparatus 20 reads the bit rate information of the video specified by the request data, that is, the bit rate information of the video stored in its own apparatus from the bit rate information storage unit 202 and transmits the read bit rate information of the video to the request source (the smart phone 10 in this exemplary embodiment). The bit rate information acquiring unit 101 acquires the bit rate information transmitted as described above. The bit rate information acquiring unit 101 supplies the acquired bit rate information to the bit rate determining unit 105.

The bit rate determining unit 105 determines any one of the plurality of bit rates indicated by the bit rate information acquired by the bit rate information acquiring unit 101 as the bit rate of the video to be played back. The bit rate decision method will be described later in detail. The bit rate determining unit 105 repeatedly determines the bit rate at determined time intervals. For example, an interval of a time (for example, intervals of one second when a playback time is 2 seconds or the like) shorter than a playback time of the video indicated by one piece of segment data is used as the time interval. Each time the bit rate is determined, the bit rate determining unit 105 notifies the delivery requesting unit 106 of the determined bit rate.

The delivery requesting unit 106 requests an apparatus (the video delivering apparatus 20 in this exemplary embodiment) that delivers the video by streaming to deliver the video at the bit rate determined by the bit rate determining unit 105. When the bit rate determined by the bit rate determining unit 105 is changed, the bit rate of the video that is delivered by streaming by the delivery requesting unit 106 is also changed.

When the stream delivery of the video is requested from an external apparatus, the segment data reading unit 204 of the video delivering apparatus 20 reads the segment data of the requested video. Upon receiving designation data transmitted from the smart phone 10, the segment data reading unit 204 reads a set number of pieces of segment data from the segment data group of the bit rate designated by the designation data in order from the beginning of the video.

Thereafter, the segment data reading unit 204 repeatedly performs the process of reading a set number of pieces of segment data subsequently to the read segment data at intervals of a playback time of a part of the video indicated by the segment data, which is read one time, or a time shorter than the playback time of the part. When the designated bit rate is changed in the middle, the segment data reading unit 204 reads a set number of pieces of segment data from a part from which a playback position is continued among the segment data of the new bit rate. Each time the segment data are read, the segment data reading unit 204 supplies the read segment data to the segment data transmitting unit 205.

The segment data transmitting unit 205 transmits the supplied segment data to the designation data transmission source, that is, the request source (the smart phone 10 in this exemplary embodiment) that has requested the stream delivery of the video. The segment data receiving unit 107 of the smart phone 10 receives the segment data transmitted from the video delivering apparatus 20. The segment data receiving unit 107 supplies the received segment data to the temporary storage unit 108.

The temporary storage unit 108 temporarily stores the segment data received by the segment data receiving unit 107 until the part of the video indicated by the segment data is played back. When the segment data are stored in the temporary storage unit 108, the video playing-back unit 109 sequentially reads the stored segment data, and sequentially plays back the video indicated by the read segment data. Since the segment data are encoded as described above, the video playing-back unit 109 decodes and plays back the segment data. The video playing-back unit 109 causes the played-back video to be displayed on a display region but causes the video to be displayed on a different display region according to a direction of its own apparatus.

Figure 6A:
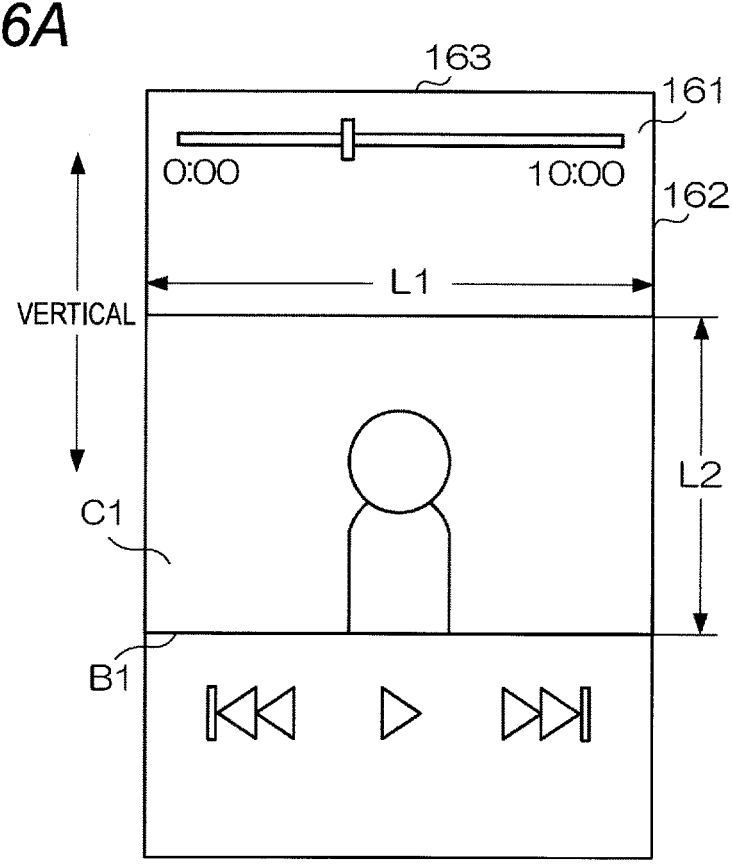
FIG. 6A is a diagram illustrating an exemplary video displayed on a display region.
Figure 6B:
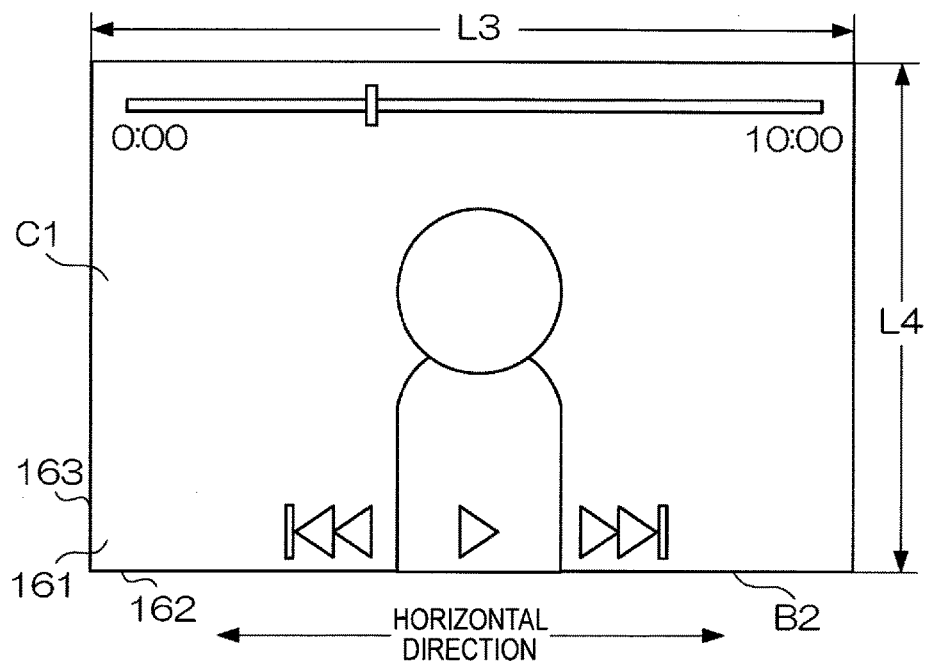
FIG. 6B is a diagram illustrating an exemplary video displayed on a display region.
Figures 6C, 7:
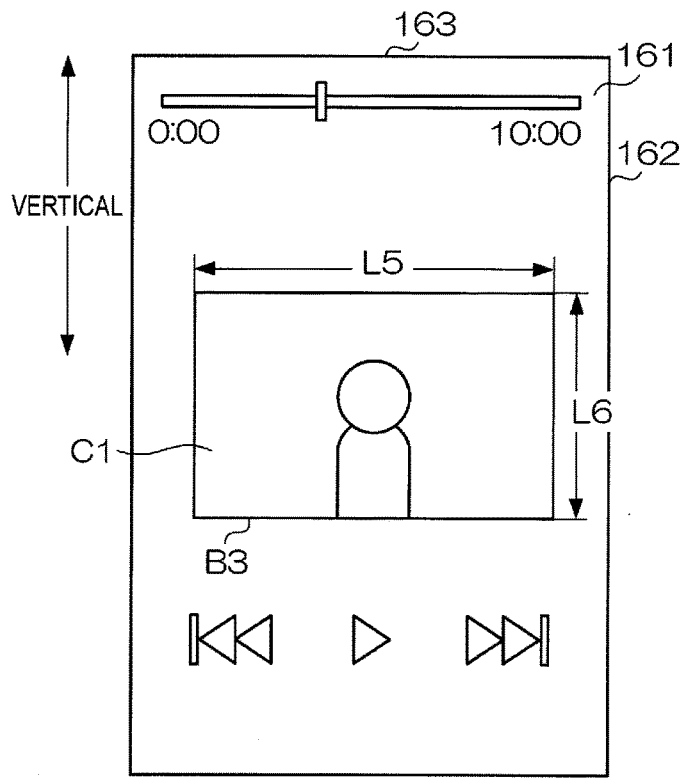
FIG. 6C is a diagram illustrating an exemplary video displayed on a display region.
FIG. 7 is a diagram illustrating an exemplary bit rate table.

FIGS. 6A to 6C illustrate an exemplary video displayed on the display region. In FIGS. 6A to 6C, the video is displayed on a display surface 161 of the touch screen 16 illustrated in FIG. 2. The display surface 161 is a rectangular surface surrounded by long sides 162 and short sides 163. FIG. 6A illustrates a display region B1 when the smart phone 10 is disposed so that the long side 162 of the display surface 161 is along the vertical direction, and FIG. 6B illustrates a display region B2 when the smart phone 10 is disposed so that the long side 162 of the display surface 161 is along the horizontal direction. A video C1 in which a person is shown is displayed on both of the display regions B1 and B2. As described above, the video playing-back unit 109 causes the video to be displayed on the display region B1 or B2 according to an inclination of its own device.

The display region size specifying unit 102 of the smart phone 10 specifies the size of the display region of the video that is delivered by streaming. The display region size specifying unit 102 is an example of a "first specifying unit" according to the exemplary embodiment of the present invention. The display region size specifying unit 102 transmits an inquiry about a type of the display region (one of the display regions B1 and B2) in which the video is displayed to the video playing-back unit 109. Upon receiving the inquiry, the video playing-back unit 109 notifies the display region size specifying unit 102 of the type of the display region in which the video is displayed. The display region size specifying unit 102 specifies the size corresponding to the type of the display region that is notified of as the size of the display region.

When the display region B1 is notified of as the type of the display region, the display region size specifying unit 102 specifies a value obtained by multiplying a length L1 of the long side by a length L2 of the short side illustrated in FIG. 6A, that is, an area of the display region as the size of the display region. Further, when the display region B2 is notified of as the type of the display region, the display region size specifying unit 102 specifies a value obtained by multiplying a length L3 of the long side by a length L4 of the short side illustrated in FIG. 6B as the size of the display region.

The short side of the display region B1 contacts with the long side 162 of the display surface 161, and the short side of the display region B2 contacts with the short side 163 of the display surface 161, but the size and the arrangement of the display region are not limited to this example. The video playing-back unit 109 may cause the video C1 to be displayed on a display region B3 in which none of the long side and the short side contacts with the long side 162 and the short side 163 of the display surface 161, for example, as illustrated in FIG. 6C. In this case, the display region size specifying unit 102 specifies a value obtained by multiplying a length L5 of the long side and a length L6 of the short side of the display region B3 as the display region size. The display region size specifying unit 102 supplies size information (information indicating the area of the display region in this exemplary embodiment) indicating the size of the display region specified as described above to the bit rate determining unit 105.

The cache amount specifying unit 103 of the smart phone 10 specifies a cache amount in the stream playback, that is, a data amount of the segment data temporarily stored for a period of the video to be next played back, in the video that is played back by streaming. The cache amount specifying unit 103 is an example of a "second specifying unit" according to the exemplary embodiment of the present invention. The cache amount specifying unit 103 refers to the segment data temporarily stored in the temporary storage unit 108, and specifies a playback time in which the segment data that are referred to is played back as the cache amount. For example, when the cached segment data indicate a video of 2 seconds, and 0.5 seconds have been already played back, the cache amount specifying unit 103 specifies that the video of 1.5 seconds is cached, and supplies information indicating 1.5 seconds to the bit rate determining unit 105 as cache amount information.

The bandwidth specifying unit 104 of the smart phone 10 specifies a bandwidth in reception of the segment data of the video delivered by streaming. The bandwidth specifying unit 104 is an example of a "third specifying unit" according to the exemplary embodiment of the present invention. The bandwidth specifying unit 104 monitors the segment data receiving unit 107, and specifies a data size of the segment data received per unit time by the segment data receiving unit 107 as the bandwidth. For example, when the segment data of 10 Mbps are received for one second, the segment data receiving unit 107 specifies 10 Mbps as the bandwidth. The segment data receiving unit 107 supplies bandwidth information indicating the specified bandwidth to the bit rate determining unit 105.

The display region size specifying unit 102, the cache amount specifying unit 103, and the bandwidth specifying unit 104 perform the specifying process as the same time intervals as the time intervals at which the bit rate determining unit 105 repeatedly determines the bit rate in this exemplary embodiment.

The bit rate determining unit 105 determines the bit rate of the video that is played back based on the size of the display region specified by the display region size specifying unit 102, the cache amount specified by the cache amount specifying unit 103, and the bandwidth specified by the bandwidth specifying unit 104. For example, the bit rate determining unit 105 uses a bit rate table in which the size of the display region is associated with a bit rate range.

FIG. 7 illustrates an exemplary bit rate table. In an example of FIG. 7, five bit rates such as 4.0 Mbps, 2.0 Mbps, 1.0 Mbps, 0.5 Mbps, and 0.3 Mbps are assumed to be defined for the stream delivery. In this case, a bit rate ranges of "2.0, 1.0, 0.5, 0.3" (whose unit is all Mbps) is associated with a size of the display region of "less than threshold value Th1." A bit rate range of "4.0, 2.0, 1.0, 0.5" is associated with a size of the display region of "equal to or larger than threshold value Th1 and less than threshold value Th2," and a bit rate range of "4.0, 2.0, 1.0" is associated with a size of the display region of "equal to or larger than threshold value Th2."

The bit rate determining unit 105 reads the bit rate range associated with the size of the display region specified by the display region size specifying unit 102 from the bit rate table. The bit rate determining unit 105 narrows the read bit rate range down to a range that does not exceed the bandwidth specified by the bandwidth specifying unit 104. For example, when the size of the display region less than the threshold value Th1 is specified, the bit rate determining unit 105 reads the bit rate range of "2.0, 1.0, 0.5, 0.3," and when the bandwidth of 1.2 Mbps is specified, since the bit rate of 2.0 Mbps exceeds the specified bandwidth, the bit rate determining unit 105 narrows the bit rate range down to "1.0, 0.5, 0.3."

When a playback time (hereinafter, referred to as a "cache playback time"), for which the video indicated by the temporarily stored segment data having the cache amount specified by the cache amount specifying unit 103 is played back, is equal to or larger than a set threshold value Th3, the bit rate determining unit 105 selects any one of the bit rates of up to a set number in a descending order within the narrowed-down range (i.e., selects any one of the bit rate(s) from a set number of highest bit rates within the narrowed-down range), and determines the selected bit rate as the bit rate of the video that is played back. In this exemplary embodiment, the bit rate determining unit 105 regards 1 as the set number, that is, selects the highest bit rate and determines the highest bit rate as the bit rate of the video that is played back. When the narrowed-down range is "1.0, 0.5, 0.3" as in the above example, the bit rate determining unit 105 determines "1.0" which is the highest bit rate among them as the bit rate of the video to be played back.

Further, when the cache playback time is less than the threshold value Th3, the bit rate determining unit 105 selects any one of the bit rates from a set number in an ascending order within the narrowed-down range (i.e., selects any one of the bit rate(s) from a set number of lowest bit rates within the narrowed-down range), and determines the selected bit rate as the bit rate of the video that is played back. In this exemplary embodiment, a number that causes all the bit rates excluding the highest bit rate to be included is set. Thus, the bit rate determining unit 105 selects any one of the bit rates excluding the highest one in the narrowed-down range, and determines the selected bit rate as the bit rate of the video that is played back.

When the narrowed-down range is "1.0, 0.5, 0.3" as in the above-described example, the bit rate determining unit 105 selects any one of "0.5, 0.3" excluding "1.0" which is the highest bit rate among them, and determines the selected bit rate as the bit rate of the video to be played back. When any one of two or more bit rates is selected, for example, the bit rate determining unit 105 may consistently select the highest bit rate among them when importance is placed on the resolution of the video or may consistently select the lowest bit rate among them when importance is placed on the continuity of the video.

However, immediately after a video playback operation is received, since the segment data are not received yet, the bandwidth is not specified by the bandwidth specifying unit 104 yet, and the segment data are not cached yet, and thus the cache amount is neither specified by the cache amount specifying unit 103. In this regard, when the playback is performed from the beginning of the video, the bit rate determining unit 105 determines the bit rate without using the cache amount specified by the cache amount specifying unit 103 and the bandwidth specified by the bandwidth specifying unit 104 until an initial response period set as a period in which the decision method at the initial stage of the playback is used elapses. In other words, the bit rate determining unit 105 determines the bit rate based on only the size of the display region specified by the display region size specifying unit 102 until the initial response period elapses.

For example, a period until the cache amount and the bandwidth are initially specified is set as the initial response period. Further, a period in which the specifying of the cache amount and the bandwidth is expected to be completed, which is set based on a record of a time required for the specifying, may be used as the initial response period. In the initial response period, for example, the bit rate determining unit 105 selects any one of the bit rates in the bit rate range which is associated with the specified size of the display region in the bit rate table illustrated in FIG. 7, and determines the selected bit rate as the bit rate of the video to be played back.

The bit rate determining unit 105 may select the highest bit rate from the range when the importance is placed on the resolution of the video or may select the lowest bit rate from the range when the importance is placed on the continuity of the video. The present invention is not limited to this example, and, for example, when the frame rate desired by the user is set in advance, the bit rate determining unit 105 may select a bit rate of a value obtained by multiplying the set frame rate by the specified size of the display region and a coefficient or a bit rate of a value closest to the value and determine the selected bit rate as the bit rate of the video to be played back.

The respective apparatuses included in the video delivery system 1 perform a stream delivery process on the video based on the above-described configuration.

Figure 8:
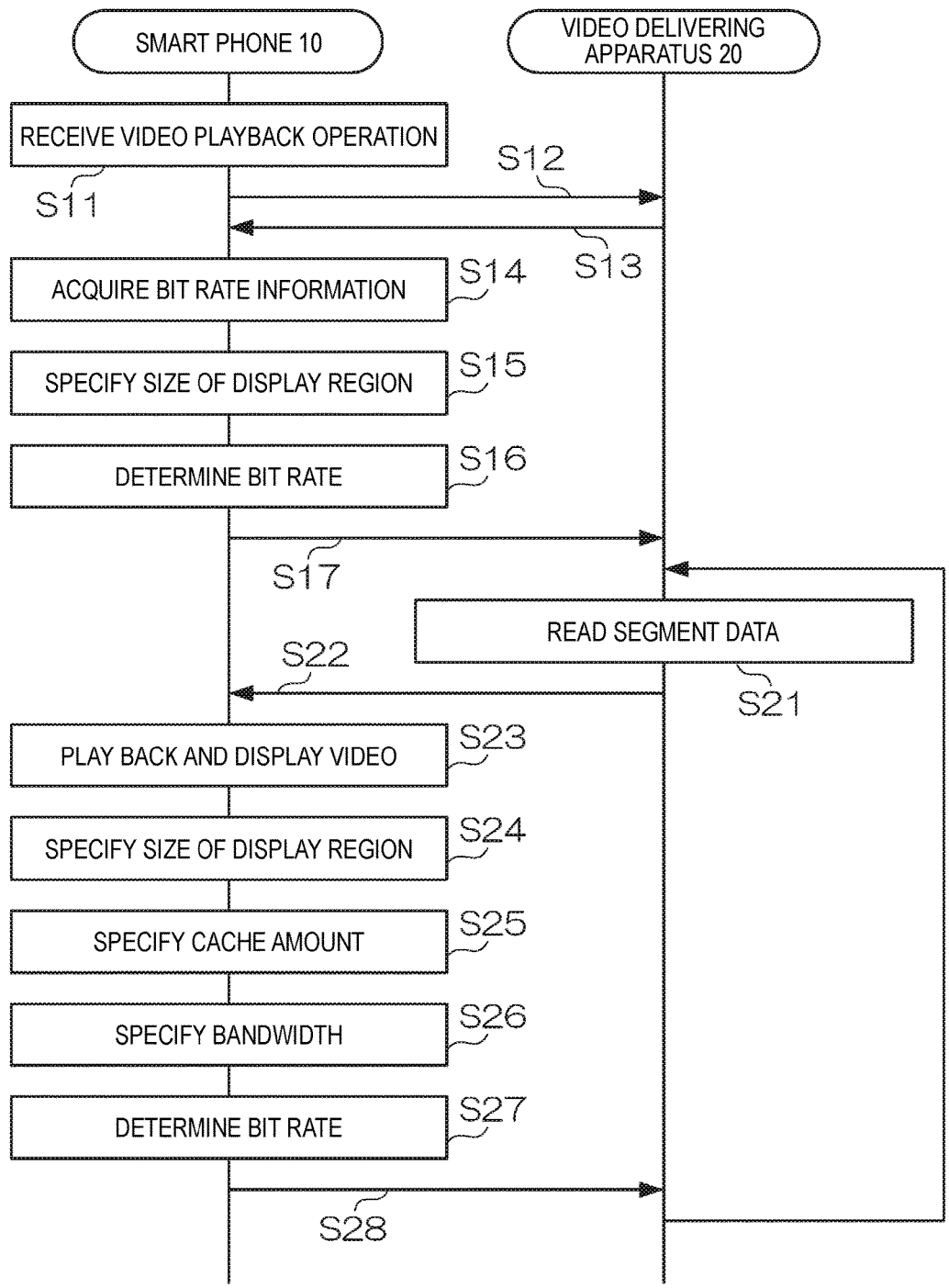
FIG. 8 is a diagram illustrating an exemplary operation process of respective apparatuses in a stream delivery process.

FIG. 8 illustrates an exemplary operation process of the respective apparatuses in the stream delivery process. In an example of FIG. 8, when the user performs an operation (for example, an operation of selecting a link of the video) of causing the smart phone 10 to play back the video that is delivered by streaming, the operation process starts.

First, the smart phone 10 receives the video playback operation (step S11). Then, the smart phone 10 (the bit rate information acquiring unit 101) requests the video delivering apparatus 20 to transmit the bit rate information of the video for which the playback operation is received (step S12). The video delivering apparatus 20 (the bit rate information transmitting unit 203) reads the requested bit rate information of the video, and transmits the read bit rate information of the video to the smart phone 10 (step S13). The smart phone 10 (the bit rate information acquiring unit 101) acquires the transmitted bit rate information (step S14).

Then, the smart phone 10 (the display region size specifying unit 102) specifies the size of the display region of the video for which the playback operation is received (step S15). Then, the smart phone 10 (the bit rate determining unit 105) determines the bit rate of the video according to the specified size (step S16). Then, the smart phone 10 (the delivery requesting unit 106) requests the video delivering apparatus 20 to perform the stream delivery of the video at the bit rate determined in step S16 (step S17).

The video delivering apparatus 20 (the segment data reading unit 204) reads the segment data indicating the video of the bit rate requested in step S17 (step S21). Then, the video delivering apparatus 20 (the segment data transmitting unit 205) transmits the segment data read in step S21 to the smart phone 10 (step S22). The smart phone 10 (the segment data receiving unit 107) receives the segment data transmitted in step S22. The smart phone 10 (the temporary storage unit 108) temporarily stores the received segment data.

Then, the smart phone 10 (the video playing-back unit 109) reads and plays back the segment data temporarily stored, and causes the segment data to be displayed on the display region (step S23). Then, the smart phone 10 (the display region size specifying unit 102) specifies the size of the display region of the played-back video (step S24). Then, the smart phone 10 (the cache amount specifying unit 103) specifies a data amount of the segment data temporarily stored, that is, the cache amount (step S25).

Then, the smart phone 10 (the bandwidth specifying unit 104) specifies the bandwidth in the reception of the segment data (step S26). Then, the smart phone 10 (the bit rate determining unit 105) determines the bit rate based on the size of the display region specified in step S24, the cache amount specified in step S25, and the bandwidth specified in step S26 (step S27). The smart phone 10 (the delivery requesting unit 106) requests the video delivering apparatus 20 to deliver the video of the bit rate determined in step S27 (step S28).

The video delivering apparatus 20 (the segment data reading unit 204) returns to step S21, and reads the segment data indicating the video of the bit rate requested in step S28. Thereafter, the operation of steps S21 to S28 is repeated until the user ends the playback operation or the video is played back up to the end, and so the playback of the video ends.

In the playback of the video, unless the bit rate is changed, as the display region decreases, the resolution of the video increases. In other words, when the display region is small, although the bit rate is low, the decrease in the resolution of the video is suppressed compared to when the display region is large. In this exemplary embodiment, since the bit rate corresponding to the specified size of the display region is determined, compared to when the size of the display region is not considered, a phenomenon that, when the display region is small, the video of the resolution higher than necessary is displayed, and the wireless communication band is compressed is suppressed.

In this exemplary embodiment, the bit rate is determined based on the specified cache amount as well. For example, when the cache amount is relatively large (when the cache playback time is equal to or larger than the threshold value Th3), a high bit rate is selected, and when the cache amount is relatively small (when the cache playback time is less than the threshold value Th3), a low bit rate is selected.

When the cache amount is relatively large, a time taken to download the segment data is longer than when the cache amount is relatively small, but the playback of the video is more unlikely to be interrupted, and thus when the high bit rate is selected as described above, the resolution of the video is improved while maintaining the continuity of the video at a predetermined level. At least the playback quality of the video is improved to be higher than when the cache amount (the data amount of the segment data temporarily stored) is not considered. Here, the playback quality refers to a comprehensive quality including the level of the resolution of the video and the playback continuity (in which the playback is not interrupted).

On the other hand, when the cache amount is relatively small, if a time taken to download the segment data is long, the playback of the video is more likely to be interrupted than when the cache amount is relatively large, and thus when the low bit rate is selected as described above, it takes a time to receive new segment data, but the playback of the video indicated by the data temporarily stored is unlikely to be interrupted. In other words, the situation in which the playback of the video indicated by the segment data temporarily stored ends before the reception of the new segment data ends, and thus the video is interrupted is more likely to occur than when the bit rate is selected by a different method from that of this exemplary embodiment.

Further, in this exemplary embodiment, the bit rate is determined based on the specified bandwidth as well. When the bandwidth is high, and the video is unlikely to be interrupted, the high bit rate is selected so that the resolution of the video is increased, and the playback quality of the video is improved by improving the resolution of the video, whereas when the bandwidth is low, the low bit rate is selected so that the video is unlikely to be interrupted, and the playback quality of the video is improved by improving the continuity of the video.

In this exemplary embodiment, the bit rate is determined based on the size of the display region and the cache amount in addition to the bandwidth as described above, and thus the playback quality is improved to be higher than, for example, when the bit rate is determined in view of only the bandwidth. Further, in this exemplary embodiment, in the initial response period, the bit rate is determined without using the cache amount and the bandwidth. As a result, the bit rate is determined even in the period in which the cache amount and the bandwidth are not specified yet, and thus the playback quality of the video is improved to be higher than when the bit rate is determined without considering the size of the display region in the initial response period.

[2] Modified Example

The above exemplary embodiment is an example of the present invention, and modifications can be made as follows. The exemplary embodiment and modified examples may be carried out in combination with each other as necessary.

[2-1] Bit Rate Decision Method

The bit rate decision method by the bit rate determining unit 105 is not limited to the above-described example. For example, the bit rate determining unit 105 determines the bit rate that leads an increase in the data amount of the segment data temporarily stored in the temporary storage unit 108 among the bit rates in the bit rate range narrowed down similarly to the example as the bit rate of the video to be played back.

For example, in the state in which the stream delivery is being performed at the bit rate of 0.5 Mbps, the bit rate range is assumed to be narrowed down to "1.0, 0.5, 0.3" (Mbps) based on the size of the display region and the bandwidth using the bit rate table illustrated in FIG. 7. Since the data amount is decreased when 0.3 Mbps among them is selected, the data amount does not change when 0.5 Mbps is selected, but the data amount is increased when 1.0 Mbps is selected, the bit rate determining unit 105 selects 1.0 Mbps and determines 1.0 Mbps as the bit rate of the video to be played back.

For example, when there are a plurality of bit rates that lead the increase in the data amount, the bit rate determining unit 105 may select the highest bit rate and determine the highest bit rate as the bit rate of the video to be played back when the importance is placed on the resolution of the video or may select the lowest bit rate and determine the lowest bit rate as the bit rate of the video to be played back when the importance is placed on the continuity of the video. Using this decision method, the data amount of the segment data stored in the temporary storage unit 108 is increased due to the change in the bit rate, and thus the playback of the video is more unlikely to be interrupted than when the bit rate that does not lead to the increase in the data amount is selected.

The bit rate determining unit 105 may determine any one of the bit rates that lead to an increase in the playback time by the segment data temporarily stored in the temporary storage unit 108 in the above-described range as the bit rate of the video to be played back. In the case in which an increase in the bit rate leads to an increase in the frame rate and an increase in the resolution as in the example, if the number of frames is increased, the data amount is mostly increased as well, but, for example, there are cases in which the bit rate that does not lead to the increase in the data amount by decreasing the resolution of the video instead of increasing the number of frames is used as well. In this case, using this decision method, since the bit rate at which the data amount is not increased, but the number of frames is increased is determined, the playback of the video is more unlikely to be interrupted, and the communication load is likely to be reduced.

[2-2] Playback Speed

The bit rate determining unit 105 may change the bit rate decision method according to the playback speed of the video. In the present modified example, the level of the bit rate is assumed to correspond to at least one of the level of the resolution of the video and the level of the frame rate of the video. Specifically, as the bit rate is increased, either or both of the resolution and the frame rate is increased. For example, the resolution may not change in a certain bit rate range although the bit rate is increased, for example, when the bit rate is increased to 0.5 Mbps, 1.0 Mbps, 2.0 Mbps, and 4.0 Mbps, the resolution may be increased to 640×360, 854×480, 854×480, and 1280×720.

Figure 9:
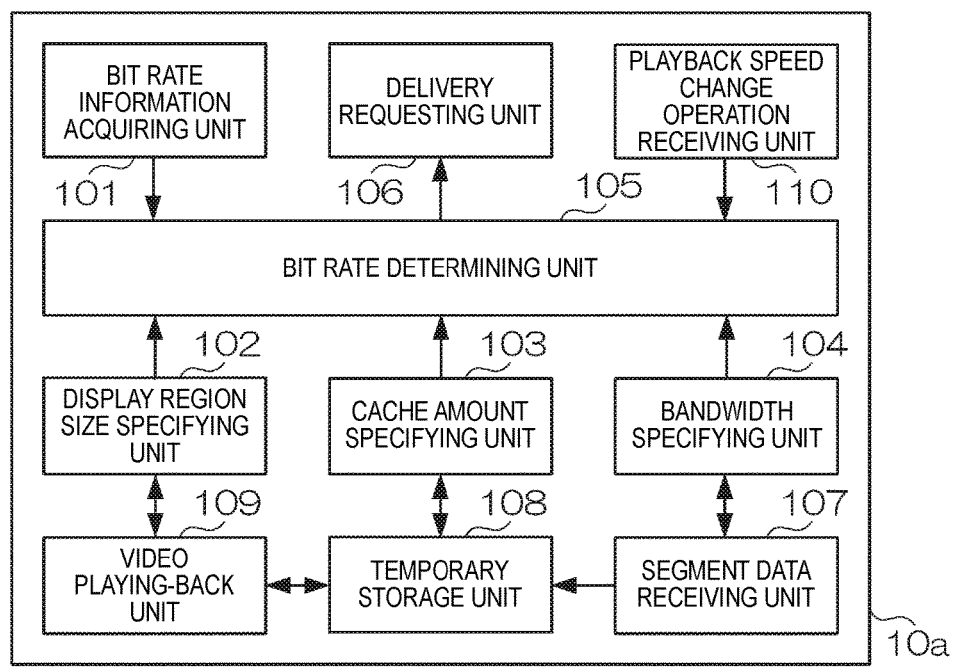
FIG. 9 is a diagram illustrating a functional configuration implemented by a smart phone according to a modified example.

FIG. 9 illustrates a functional configuration implemented by a smart phone 10*a* according to the present modified example. The smart phone 10*a* includes a playback speed change operation receiving unit 110 in addition to the units illustrated in FIG. 5. The playback speed change operation receiving unit 110 receives an operation of changing the playback speed of the video that is being played back by streaming. Examples of the operation of changing the playback speed include a fast-forward operation, a slow playback operation, and a rewind operation. Upon receiving the playback speed changing operation, the playback speed change operation receiving unit 110 notifies the bit rate determining unit 105 of content of the received operation.

The bit rate determining unit 105 determines the bit rate based on the content of the operation that is reported from the playback speed change operation receiving unit 110. For example, when the video is played back at a speed (first-forward playback), the bit rate determining unit 105 determines the bit rate in which the resolution or the frame rate is lower than that at the time of the normal playback. For example, when the bit rate range is narrowed down to the three bit rates of 4.0 Mbps, 2.0 Mbps, and 1.0 Mbps according to the size of the display region and the bandwidth, and the cache amount is equal to or larger than the threshold value Th3, the bit rate determining unit 105 is assumed to select the highest bit rate (4.0 Mbps) in the normal playback and determines the highest bit rate (4.0 Mbps) as the bit rate of the video to be played back.

In this case, when the notification indicating that the fast-forward playback is performed is received from the playback speed change operation receiving unit 110, the bit rate determining unit 105 selects the second highest bit rate (2.0 Mbps) or the third highest bit rate (1.0 Mbps) in which the resolution and the frame rate are lower than at the time of the normal playback and determines the selected bit rate as the bit rate of the video to be played back. Since the user mostly performs the fast-forward playback when the user search for a scene which the user wants to view, in this case, it is desirable that a scene that is played back can be roughly understood, and thus the high resolution and the high frame rate are mostly not necessary.

Using this decision method, at the time of the fast-forward playback, the resolution and the frame rate are lower than at the time of the normal playback, but the user does not feel uncomfortable mostly due to the above reason. On the other hand, the communication load of the segment data is reduced to be smaller, and it is easier to secure a band for other stream delivery than when the normal playback is performed, and the bit rate decision method is not changed. Further, compared to when the normal playback is performed, and the bit rate decision method is not changed, a time per unit time required to receive the segment data is shorter, and the playback time by the segment data temporarily stored when the normal playback is performed after the fast-forward playback ends is longer, and thus the playback of the video is unlikely to be interrupted after the fast-forward playback ends. As a result, the playback quality is improved to be higher than when the normal playback is performed, and the bit rate decision method is not changed.

The bit rate determining unit 105 may determine the bit rate based on a magnification ratio in the fast-forward playback. For example, the bit rate determining unit 105 determines the bit rate such that the bit rate that decreases as the magnification ratio increases is selected. As the magnification ratio increases, the data amount of the transmitted segment data increases, and thus a time required until the reception is completed increases, and the playback is likely to be interrupted. In this regard, since the bit rate is determined based on the magnification ratio of the fast-forward playback, the fast-forward playback is more unlikely to be interrupted, and the playback quality of the video is improved to be higher than when the magnification ratio is not considered.

Further, when the video is played back at a slow speed (slow playback), the bit rate determining unit 105 determines the bit rate in which the resolution or the frame rate is higher than at the time of the normal playback. For example, when the bit rate range is narrowed down to the three bit rates of 4.0 Mbps, 2.0 Mbps, and 1.0 Mbps according to the size of the display region and the bandwidth, and the cache amount is equal to or larger than the threshold value Th3, the bit rate determining unit 105 is assumed to select the lowest bit rate (1.0 Mbps) in the normal playback and determines the lowest bit rate (1.0 Mbps) as the bit rate of the video to be played back.

In this case, when the notification indicating that the slow playback is performed is received from the playback speed change operation receiving unit 110, the bit rate determining unit 105 selects the second highest bit rate (2.0 Mbps) or the highest bit rate (4.0 Mbps) in which the resolution and the frame rate are higher than at the time of the normal playback and determines the selected bit rate as the bit rate of the video to be played back. Since the user performs the slow playback when the user wants to view the scene more carefully, it is desirable that the resolution and the frame rate be high. Using this decision method, at the time of the slow playback, the video in which the resolution or the frame rate is higher than at the time of the normal playback is played back. As a result, the playback quality is improved to be higher than when the normal playback is performed, and the bit rate decision method is not changed.

The bit rate determining unit 105 may determine the bit rate based on the magnification ratio in the slow playback. For example, the bit rate determining unit 105 determines the bit rate such that the bit rate that increases as the magnification ratio decreases (that is, the speed decreases) is selected. In the case of the slow playback, as the magnification ratio decreases, a period until a next frame is played back increases, and thus although the bit rate is increased, the playback (the slow playback) of the video is unlikely to be interrupted. In this regard, since the bit rate is determined based on the magnification ratio of the slow playback, the resolution or the frame rate of the video and the playback quality of the video are improved to be higher than when the magnification ratio is not considered.

[2-3] Acquisition of Still Image

A mechanism of acquiring a still image indicating a certain scene of the video that is played back may be provided.

Figure 10:
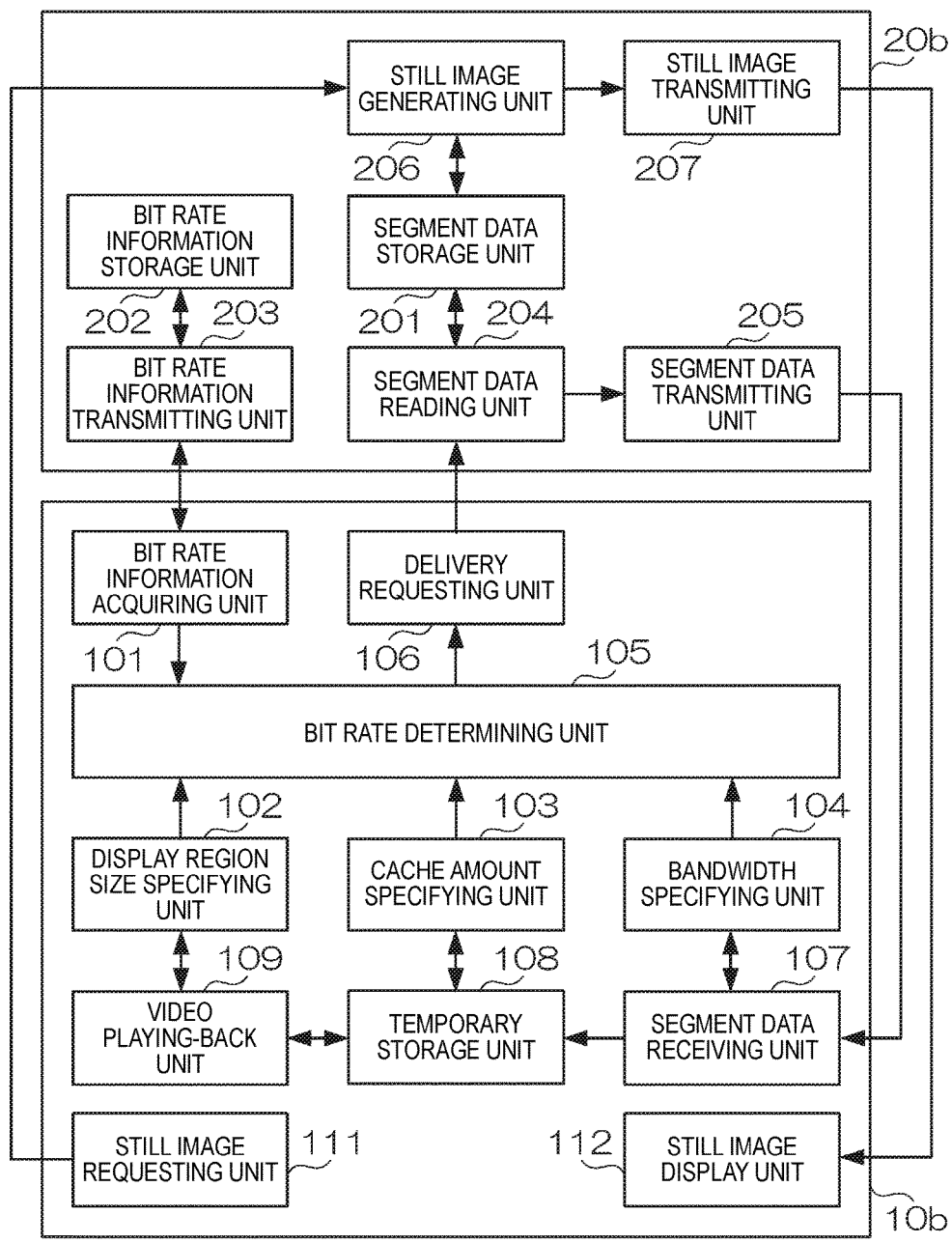
FIG. 10 is a diagram illustrating functional configurations implemented by respective apparatuses according to a modified example.

FIG. 10 illustrates functional configurations implemented by the respective apparatuses according to the present modified example. In an example of FIG. 10, a smart phone 10*b* including a still image requesting unit 111 and a still image display unit 112 in addition to the units illustrated in FIG. 5 is illustrated. Further, a video delivering apparatus 20*b* including a still image generating unit 206 and a still image transmitting unit 207 in addition to the units illustrated in FIG. 5 is illustrated.

When the user performs an operation for acquiring a still image of a certain scene of the video that is played back, the still image requesting unit 111 of the smart phone 10*b* requests the video delivering apparatus 20*b* to transmit the still image of the scene. In further detail, when an operation for acquiring a still image of a certain scene of the video is performed while the playback of the video is being performed at a first bit rate, the still image requesting unit 111 requests the still image of the scene in a video of a second bit rate higher than the first bit rate.

For example, when the first bit rate (the bit rate of the video during the playback) is 1.0 Mbps, the still image requesting unit 111 requests the still image using a bit rate that is one step higher than the first bit rate as the second bit rate. The second bit rate is not limited to this example and may be the highest bit rate of the video that is delivered by streaming.

The still image requesting unit 111 makes the request by transmitting request data indicating the video in which the still image is requested, the scene of the still image, and the second bit rate to the video delivering apparatus 20*b*. For example, a URL of the video is used as information specifying the video, and for example, a playback time of the scene is used as information specifying the scene of the still image.

Upon receiving the transmitted request data, the still image generating unit 206 of the video delivering apparatus 20*b* generates the still image of the scene indicated by the request data with reference to the segment data of the video of the bit rate indicated by the request data. The still image generating unit 206 decodes the segment data including the target scene, and generates the still image of the scene. For example, the still image generating unit 206 generates the still image at a predetermined file format (joint photographic experts group (JPEG), portable network graphics (PNG), or the like).

When the still image requested from the still image requesting unit 111 is generated as described above, the still image generating unit 206 supplies the generated still image to the still image transmitting unit 207. The still image transmitting unit 207 transmits the supplied still image, that is, the still image requested from the still image requesting unit 111 to the smart phone 10*b* serving as the request source apparatus. The still image display unit 112 of the smart phone 10*b* causes the still image transmitted from the video delivering apparatus 20*b* to be displayed on the display unit (the display of the touch screen 16) of its own apparatus.

As the bit rate increases, the resolution mostly increases as well. For this reason, in the present modified example, the still image of the video of the second bit rate is requested, and thus the resolution of the still image to be displayed is more easily increased than when the still image of the video of the first bit rate is requested. On the other hand, the data size of the still image is smaller than the video that is delivered by streaming, and thus even when the resolution is increased, the communication load is small, and even when the still image having the high resolution is acquired, influence on the communication is suppressed to be small.

In the above example, the still image transmitting unit 207 transmits the still image generated from the segment data, but the present invention is not limited to this example, and, for example, data of a still image of each scene may be stored in a storage unit of its own apparatus in advance, and the requested still image of the scene may be read from the storage unit and transmitted. The number of formats of the still image to be transmitted is not limited to one, and two or more formats (for example, both JPEG and PNG or the like) may be used, and any one of the formats may be selected by the user. Further, when two or more still images are transmitted, the still image transmitting unit 207 may transmit the still images at the same time or different time (different timings).

[2-4] File Format of Still Image

In the above example, the file format of the still image is set in advance, but the present invention is not limited to this example, and the file format of the still image may be variable. For example, the still image requesting unit 111 requests the still image of the file format corresponding to the bandwidth specified by the bandwidth specifying unit 104. For this request, the still image requesting unit 111 uses, for example, a file format table in which the bandwidth is associated with the file format.

FIG. 11 illustrates an exemplary file format table. In an example of FIG. 11, "JPEG" is associated with the bandwidth of "less than threshold value Th11," and "PNG" is associated with the bandwidth of "equal to or larger than threshold value Th11." When the bandwidth is specified, the bandwidth specifying unit 104 supplies the bandwidth information indicating the specified bandwidth to the still image requesting unit 111. The still image requesting unit 111 requests the video delivering apparatus 20b to transmit the still image of the file format that is associated with the bandwidth indicated by the supplied bandwidth information in the file format table.

In the present modified example, in a situation in which the bandwidth is high (equal to or larger than the threshold value Th11), and it is easy to perform communication of data having a large size, a still image of a file format of a lossless compression format such as PNG is requested, and thus a communication amount is large, but an excellent image quality is secured even when the displayed still image is enlarged. On the other hand, in a situation in which the bandwidth is low (less than the threshold value Th11), and it is not easy to perform communication of data having a large size, a still image of a file format of a lossy compression format such as JPEG is requested, and thus an image quality is bad when the displayed still image is enlarged, but the communication amount is small, and the time taken until the still image is displayed is reduced. As described above, in the present modified example, the still image of the file format suitable for the bandwidth is displayed.

In addition to the bandwidth, for example, the file format may be set according to the purpose of the still image. For example, when the purpose is to enable the general user to view a video of a movie, a television, or the like, JPEG is desirable, but when the purpose is to check a video of a monitoring camera, the video may be enlarged in order to discern an object that is shown in the video, PNG in which a fine image can be expressed by a lossless compression scheme is used. In this case, for example, the purpose of the video is set in the smart phone 10b through the operation of the user or the like, and the still image requesting unit 111 requests the video delivering apparatus 20b to transmit the still image of the file format corresponding to the set purpose of the video. Thus, the still image of the file format suitable for the purpose of a video is displayed.

Further, the user may select the bit rate and the file format serving as the basis of the still image. In this case, the still image requesting unit 111 displays a selection screen in which the bit rate and the file format are selected, and requests the video delivering apparatus 20b to transmit the still image of the bit rate and the file format selected by the operation performed on the selection screen. Thus, the still image of the file format desired by the user is displayed.

[2-5] Server Apparatus

The bit rate may be determined by a server apparatus.

FIG. 12 illustrates an overall configuration of a video delivery system 1c according to the present modified example. The video delivery system 1c includes a communication line 2, a smart phone 10c, a video delivering apparatus 20, and a server apparatus 30.

FIG. 13 illustrates a hardware configuration of the server apparatus 30. The server apparatus 30 is a computer that includes a CPU 31, a RAM 32, a ROM 33, a NIC 34, and a HDD 35. The CPU 31 to the HDD 35 are the same hardware as the components having the same names illustrated in FIG. 4.

Figure 14:
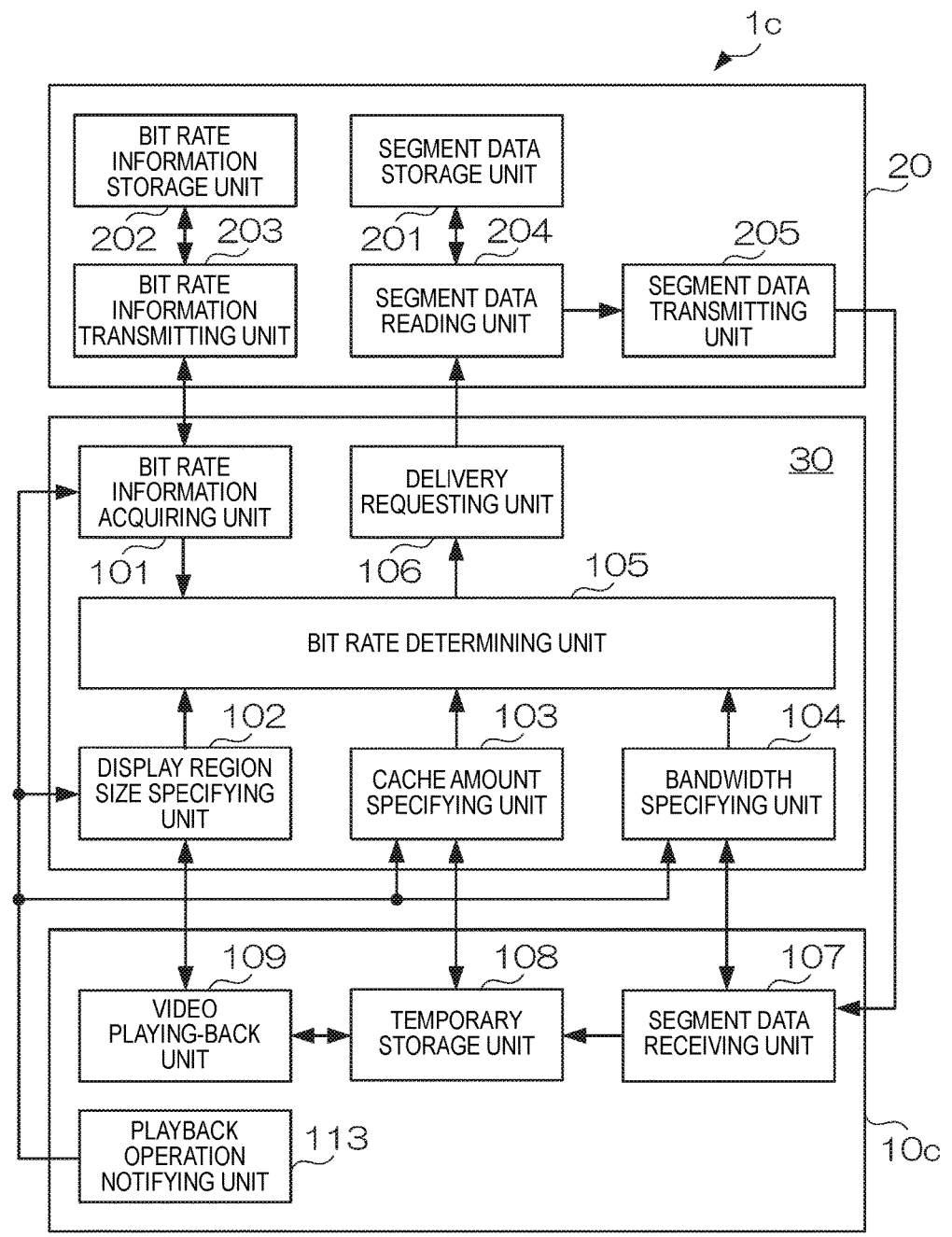
FIG. 14 is a diagram illustrating functional configurations implemented by respective apparatuses according to a modified example.

FIG. 14 illustrates functional configurations implemented by the respective apparatuses according to the present modified example. The smart phone 10c includes a playback operation notifying unit 113 in addition to the segment data receiving unit 107, the temporary storage unit 108, and the video playing-back unit 109 illustrated in FIG. 5. The server apparatus 30 includes the bit rate information acquiring unit 101, the display region size specifying unit 102, the cache amount specifying unit 103, the bandwidth specifying unit 104, the bit rate determining unit 105, and the delivery requesting unit 106 illustrated in FIG. 5.

When the operation of playing back the video that is delivered by streaming is performed on its own apparatus, the playback operation notifying unit 113 of the smart phone 10c gives a notification indicating that the operation is performed to the server apparatus 30. The notification is received by the bit rate information acquiring unit 101, the display region size specifying unit 102, the cache amount specifying unit 103, and the bandwidth specifying unit 104 of the server apparatus 30. When the notification is received, the bit rate information acquiring unit 101 acquires the bit rate information, and the specifying units perform communication with the corresponding units of the smart phone 10c (the display region size specifying unit 102 performs communication with the video playing-back unit 109, the cache amount specifying unit 103 performs communication with the temporary storage unit 108, and the bandwidth specifying unit 104 performs communication with the segment data receiving unit 107), and start the specifying operation.

Thus, the bit rate determining unit 105 determines the bit rate, and the delivery requesting unit 106 requests the delivery of the video. At this time, the delivery requesting unit 106 sets the smart phone 10c as the delivery destination of the video, and makes the request. The segment data transmitting unit 205 of the video delivering apparatus 20 transmits the segment data of the requested video to the smart phone 10c. The video of the bit rate determined by the server apparatus 30 as described above is delivered to the smart phone 10c. In the present modified example, the server apparatus 30 determines the bit rate similarly to the smart phone 10 of the example, and thus the bit rate is used such that the playback quality is improved to be higher than when the bit rate is determined in view of only the bandwidth.

[2-6] Information Processing Apparatus

The information processing apparatus such as the decision apparatus that determines the bit rate or the playback apparatus that plays back the video is not limited to the smart phone or the server apparatus. For example, the information processing apparatus may be a tablet device, a laptop PC, or a desktop PC. The smart phone functions as both the decision apparatus and the playback device, but the server apparatus functions as the decision apparatus but does not function as the playback device and thus requests the video delivering apparatus to deliver the video of the determined bit rate to an external playback device by streaming.

Even in the case of the information processing apparatus that is used in a stationary state such as the desktop PC, the display region size, the cache amount, and the bandwidth change, and thus similarly to the above example, the video of the determined bit rate is delivered by streaming, and thus the playback quality is improved to be higher than when the bit rate is determined in view of only the bandwidth.

[2-7] Display of Specified Information

The specified information described above or the determined bit rate may be displayed on the playback apparatus that plays back the video.

Figure 15:
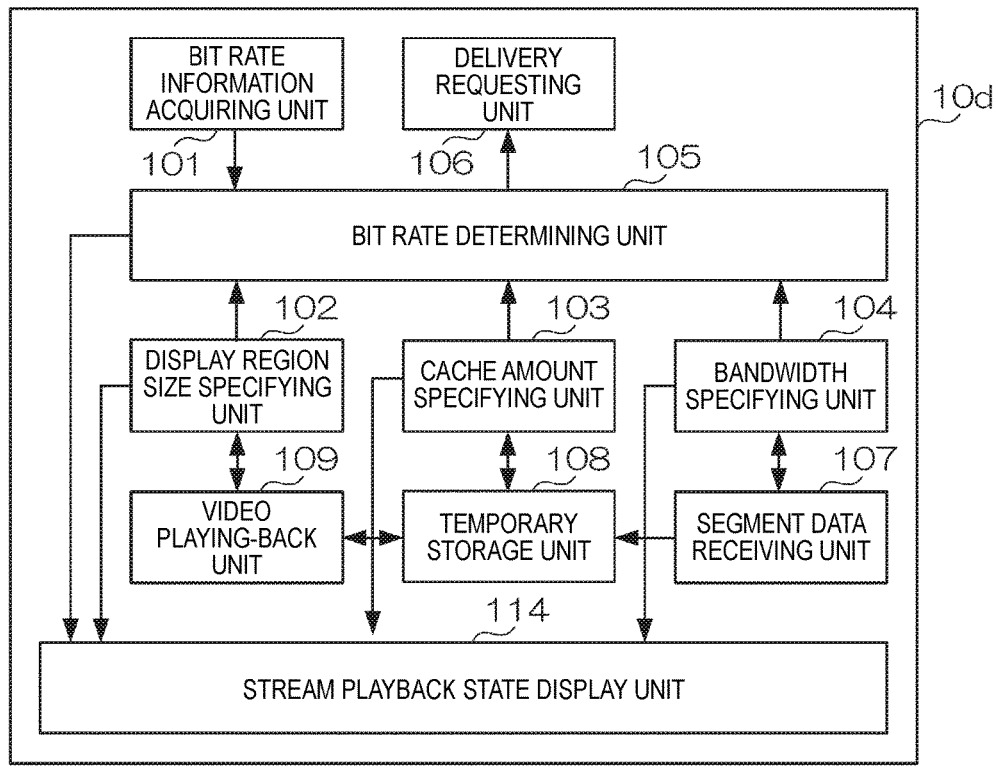
FIG. 15 is a diagram illustrating a functional configuration implemented by a smart phone according to a modified example.

FIG. 15 illustrates a functional configuration implemented by a smart phone 10d according to the present modified example. The smart phone 10d includes a stream playback state display unit 114 in addition to the units illustrated in FIG. 5. In the present modified example, the display region size specifying unit 102, the cache amount specifying unit 103, and the bandwidth specifying unit 104 supply specifying result information indicating specified results to the stream playback state display unit 114, and notify the stream playback state display unit 114 of the bit rate determined by the bit rate determining unit 105.

The stream playback state display unit 114 causes a stream playback state indicated by the supplied specifying result information and the bit rate that is notified to be displayed on the display unit of its own apparatus.

Figure 16:
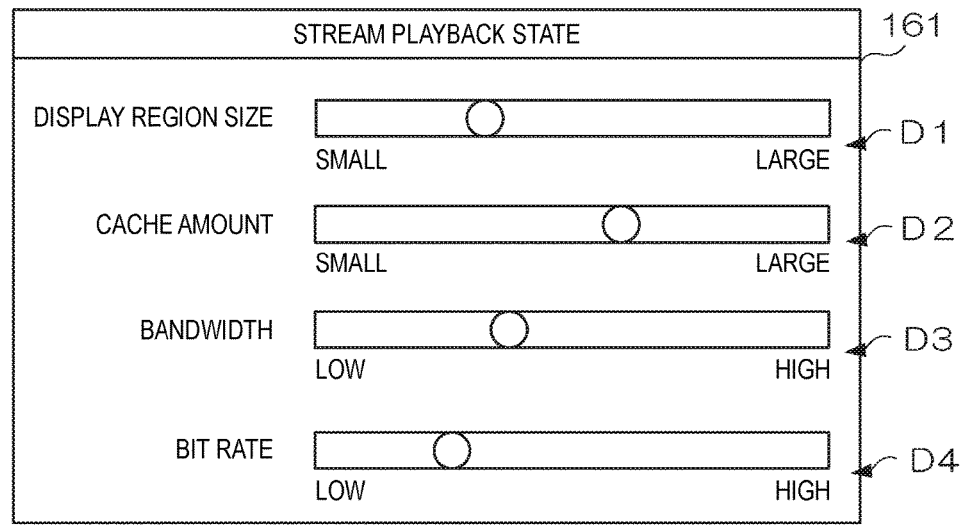
FIG. 16 is a diagram illustrating an exemplary displayed stream playback state.

FIG. 16 illustrates an exemplary displayed stream playback state. In an example of FIG. 16, character strings such as a "display region size," a "cache amount," a "bandwidth," and a "bit rate" and images D1, D2, D3, and D4 indicating states are displayed on the display surface 161 of the touch screen 16 illustrated in FIG. 2. Each of the images indicates a state according to a position of a circular image.

The image D1 indicates whether the display region size is large or small (as the circular image gets closer to "small" in the drawing, the size of the display region is decreased, and as the circular image gets closer to "large" in the drawing, the size of the display region is increased), and the image D2 indicates whether the cache amount is large or small. The image D3 indicates whether the bandwidth is high or low, and the image D4 indicates whether the bit rate is high or low. By viewing the stream playback state, for example, the user notices that the bandwidth is low, and the bit rate is low and takes an action of moving to a place in which a state of the radio wave is good. If the user understands that as the display region size decreases, the bit rate decreases, the user takes an action of increasing the bit rate by increasing the display region size.

The image D2 may be an operator for receiving an operation of changing the cache amount. For example, as the circular image moves to the left, the cache amount decreases, whereas as the circular image moves to the right, the cache amount increases. As the cache amount is increased, the cache playback time is likely to become equal to or larger than the threshold value Th3, and thus the bit rate increases. As described above, since the stream delivery state is displayed, the user can take an action of increasing or decreasing the bit rate.

[2-8] Bit Rate

In this exemplary embodiment, as the bit rate increases, the resolution of the video increases, and the frame rate increases as well, but the present invention is not limited to this exemplary embodiment. For example, although the bit rate increases, only the frame rate may increase with no change in the resolution, or only the resolution may increase with no change in the frame rate.

[2-9] Bit Rate Determining Unit

In this exemplary embodiment, the bit rate determining unit 105 determines the bit rate selected from predetermined plurality of bit rates as the bit rate of the video to be played back, but the present invention is not limited to this exemplary embodiment. For example, when a bit rate in a set range is designated, and the video delivering apparatus has a function of performing a process of converting video of a reference bit rate that is stored to a video of a designated bit rate, the bit rate determining unit 105 may determine the bit rate within the set range.

At this time, for example, the bit rate determining unit 105 may determine a value of the specified size of the display region, a value of the cache amount, or a value obtained by substituting a value of the bandwidth into a set formula as the bit rate. As a result, the stream delivery of the videos of the bit rates of more steps than when the plurality of bit rates are determined in advance is performed.

[2-10] Category of Invention

The present invention is applicable as the video delivering apparatus or the video delivery system including the video delivering apparatus in addition to the information processing apparatus such as the smart phone or the server apparatus. The present invention is applicable as an information processing method of carrying out the process implemented by the respective apparatuses and applicable as a program causing a computer controlling the respective apparatuses to operate. The program may be provided in the form of a recording medium such as an optical disk storing the program or may be provided in a form in which the program is downloaded to a computer via a communication line such as the Internet and installed for use.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising at least one hardware processor configured to play a video delivered by streaming, a bit rate of the video being changeable during playback, and the at least one hardware processor comprising:
    a first specifying unit that specifies a size of a display region of the video;
    a second specifying unit that specifies an amount of data temporarily stored for a period of the video to be next played back;
    a third specifying unit that specifies a bandwidth by which the data is received;
    a determining unit that determines the bit rate of the video delivered by streaming and played back based on the size, the data amount, and the bandwidth that are specified; and
    a still image requesting unit that, when an operation of requesting a still image of a certain scene of the video is performed while the video is being played back at a first bit rate, requests the still image of the certain scene in a video at a second bit rate higher than the first bit rate,
    wherein a plurality of bit rates are defined for stream delivery,
    wherein when a playback time of the video corresponding to the temporarily stored data is equal to or larger than a threshold value, the determining unit selects in descending order, from a bit rate range of the plurality of bit rates that corresponds to the specified size of the display region, any one of the bit rates that does not exceed the specified bandwidth, the determining unit selecting a highest bit rate within the specified bandwidth from a bit rate range associated with the specified size of the display region and
    wherein the determining unit determines the selected bit rate as the bit rate of the video that is played back.

2. The information processing apparatus according to claim 1,
    wherein the determining unit determines, as the bit rate of the video to be next played back, a bit rate within the bit rate range that leads to an increase in the amount of the temporarily stored data.

3. The information processing apparatus according to claim 1,
wherein a level of the bit rate corresponds to a level of a resolution of the video and a level of a frame rate of the video, and
wherein when the video is played back at a fast speed, the determining unit determines, as the bit rate of the video, a bit rate in which the resolution or the frame rate is lower than that at a time of normal playback.

4. The information processing apparatus according to claim 1,
wherein a level of the bit rate corresponds to a level of a resolution of the video and a level of a frame rate of the video, and
wherein when the video is played back at a slow speed, the determining unit determines, as the bit rate of the video, a bit rate in which the resolution or the frame rate is higher than that at a time of normal playback.

5. The information processing apparatus according to claim 1,
wherein the still image requesting unit requests the still image of a file format corresponding to the specified bandwidth.

6. The information processing apparatus according to claim 1,
wherein the still image requesting unit requests the still image of a file format corresponding to a purpose of the video, which is set by the at least one hardware processor.

7. The information processing apparatus according to claim 1,
wherein, when the playback starts from beginning of the video, the determining unit determines the bit rate without using the data amount and the bandwidth until a set period elapses.

8. The information processing apparatus according to claim 1, wherein the at least one hardware processor further comprises:
an acquiring unit that acquires bit rate information indicating the plurality of bit rates; and
a delivery requesting unit that requests delivery of the video by streaming at the determined bit rate.

9. An information processing method for an information processing apparatus comprising a at least one hardware processor configured to play a video delivered by streaming, a bit rate of the video being changeable during playback, the information processing method comprising:
specifying a size of a display region of the video;
specifying an amount of data temporarily stored for a period of the video to be next played back;
specifying a bandwidth by which the data is received;
determining the bit rate of the video delivered by streaming and played back based on the size, the data amount, and the bandwidth that are specified; and
when an operation of requesting a still image of a certain scene of the video is performed while the video is being played back at a first bit rate, requesting the still image of the certain scene in a video at a second bit rate higher than the first bit rate,
wherein a plurality of bit rates are defined for stream delivery,
wherein when a playback time of the video corresponding to the temporarily stored data is equal to or larger than a threshold value, the determining step includes selecting in descending order, from a bit rate range of the plurality of bit rates that corresponds to the specified size of the display region, any one of the bit rates that does not exceed the specified bandwidth, the determining step including selecting a highest bit rate within the specified bandwidth from a bit rate range associated with the specified size of the display region, and
wherein the determining step also includes determining the selected bit rate as the bit rate of the video that is played back.

10. An information processing apparatus comprising at least one hardware processor configured to play a video delivered by streaming, a bit rate of the video being changeable during playback, and the at least one hardware processor comprising:
a first specifying unit that specifies a size of a display region of the video;
a second specifying unit that specifies an amount of data temporarily stored for a period of the video to be next played back;
a third specifying unit that specifies a bandwidth by which the data is received;
a determining unit that determines the bit rate of the video delivered by streaming and played back based on the size, the data amount, and the bandwidth that are specified, the determining unit selecting a highest bit rate within the specified bandwidth from a bit rate range associated with the specified size of a display region, and
a still image requesting unit that, when an operation of requesting a still image of a certain scene of the video is performed while the video is being played back at a first bit rate, requests the still image of the certain scene in a video at a second bit rate higher than the first bit rate.

11. The information processing apparatus according to claim 1,
wherein a plurality of bit rates are defined in a stream delivery, and
wherein when a playback time, for which the video indicated by the temporarily stored data having the specified data amount is played back, is less than a threshold value, the determining unit selects any one of bit rates of up to a set number in an ascending order within a bit rate range that corresponds to the specified size of the display region and does not exceed the specified bandwidth, and determines the selected bit rate as the bit rate of the video that is played back.

12. The information processing apparatus according to claim 1, wherein the display region is configured to be variable.

13. The information processing method according to claim 9, wherein the display region is configured to be variable.

14. The information processing apparatus according to claim 10, wherein the display region is configured to be variable.

* * * * *